Dec. 19, 1950  J. L. DELVAUX  2,534,957
RESPONSE CURVE INDICATOR
Filed July 16, 1947
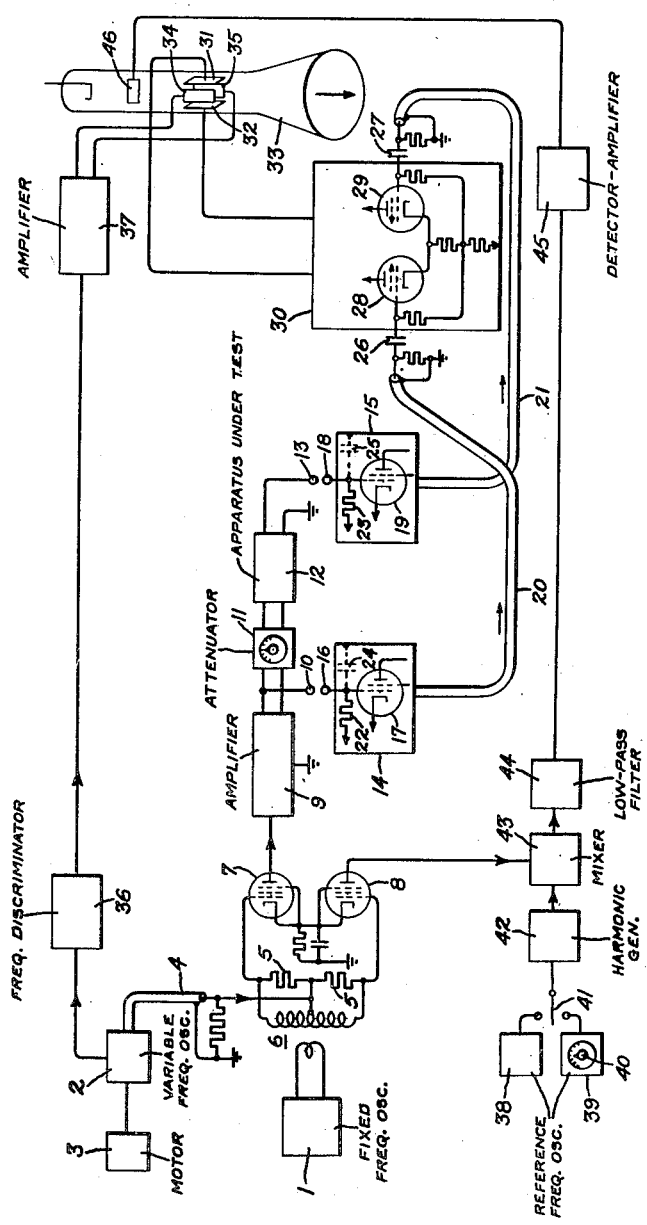
Inventor:
Jean L. Delvaux,
by Merton D. Moore
His Attorney.

Patented Dec. 19, 1950

2,534,957

UNITED STATES PATENT OFFICE 2,534,957

RESPONSE CURVE INDICATOR

Jean L. Delvaux, Paris, France, assignor to General Electric Company, a corporation of New York Application July 16, 1947, Serial No. 761,327
In France March 6, 1945

Section 1, Public Law 690, August 8, 1946
Patent expires March 6, 1965

4 Claims. (Cl. 175—183)

This invention relates to response curve indicators or recorders, and more particularly to equipment for determining the response characteristics of an electronic amplifier, or the like, including an indication of the phase distortion introduced by the apparatus under test.

An object of the invention is to provide improved equipment for determining the response characteristics of an electronic amplifier or the like.

An additional object is to provide a response curve recorder or indicator which will furnish information as to the phase distortion characteristics of the apparatus under test.

A further object is to provide improved coupling devices for connecting equipment for indicating the characteristics of apparatus to be tested so as to impose a minimum of loading or other interference with the normal operation of the apparatus.

A further object is to provide, in response characteristics testing equipment, variable frequency devices to permit consideration of characteristics of the apparatus under test over a predetermined range of different conditions.

Equipments are already known, which are generally called response-curve recorders, which serve to test the operation of an amplifier or similar apparatus. With these devices a curve is caused to appear on the screen of an oscillograph (usually a cathode-ray oscillograph), and the ordinates of this curve are proportional to the value which is assumed by the amplification factor of the tested amplifier for each one of the frequencies within the useful band of that amplifier, whereas the abscissae of the same curve are proportional, respectively, to the frequency value to which each ordinate corresponds. This curve is called the amplitude response curve of the amplifier (or like apparatus) undergoing the test.

Such equipments may comprise a generator which produces a sinusoidal signal whose frequency varies periodically within a definite band, the amplitude of which is kept constant. This signal is applied to the input end of the amplifier which is to be checked. The signal which appears at the output end of the amplifier is, in general, detected and the rectified output utilized to deflect—ordinate-wise—the light spot appearing on the fluorescent screen of the cathode-ray oscillograph. The abscissae-wise motions of the same spot take place in synchronism with the variations in the frequency of the analyzer signal.

It is known to mark on the response curve the points that correspond to definite values of the frequency. This result may be obtained by having the successive harmonics of a reference frequency signal produce beats with the analyzing signal. The beat product is filtered, detected, then amplified so that it may be applied with suitable polarity to the device for modulating the intensity of the cathode beam. As a result, each time the frequency of the analyzer signal passes through values that correspond to one of the harmonics of the reference signal, the intensity of the spot undergoes a variation which permits marking this passage. That variation may appear either as an increase or a decrease in the luminosity of the spot. If the instrument for tracing the curve is intended to verify the operation of television amplifiers, the reference frequency may be 1 megacycle per second and the points marked on the curve will then correspond to 1, 2, 3, 4, etc. megacycles per second.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which the single figure is a diagrammatic presentation of an equipment in accordance with the invention arranged with an amplifier or other apparatus to be tested.

Referring now to the drawing, a fixed frequency oscillation generator 1 and a variable frequency oscillation generator 2 are provided, a motor 3 being connected to the latter so as cyclically to vary the frequency thereof, such as by cyclically varying a capacitor or inductance associated with the oscillator circuit. A connector 4, which may be a coaxial cable, provides a voltage from variable oscillator 2 to the interconnection of two equal damping resistors 5 connected in series across the center-tapped secondary winding of a transformer 6, the primary winding of the transformer being connected to fixed frequency oscillator 1, and the center tap of the secondary winding being connected to the interconnection of the resistors. The voltage from oscillator 2 is applied through the transformer secondary and the resistors to the control electrodes of two electron tubes 7 and 8, and the voltage from oscillator 1 is applied in push-pull to the two control electrodes. Due to the symmetrical arrangement, interaction between oscillators 1 and 2 is minimized.

The frequencies of oscillators 1 and 2 are so chosen as to provide a beat frequency signal in the anode circuits of tubes 7 and 8 which varies over a desired band during the sweep of the frequency of variable oscillator 2 from a minimum to a maximum frequency or vice versa. The anode of electron tube 7 is connected to an amplifier 9 which provides a constant amplitude voltage of the varying beat frequency to a circuit including a terminal 10 and an adjustable attenuator 11. The amplifier 12, or other apparatus the characteristics of which are to be investigated, is connected to receive the signal from amplifier 9 through attenuator 11. An output connection from the amplifier under test is connected to terminal 13. Terminals 10 and 13 may conveniently comprise conductive spheres or plates. Terminal 10 is arranged to provide a signal to a pick-up amplifier such as amplifier 14 by capacitive coupling through the capacitance existing between terminal 10 and a terminal 16, the latter terminal also comprising a sphere or plate connected to the control electrode of an electron discharge tube 17. A terminal 18 similarly provides the signal appearing on terminal 13 to the control electrode of an electron tube 19. Amplifiers 14 and 15 may be arranged in the form of testing probes or movable pick-up heads and, as shown, are connected to the remainder of the equipment through flexible cables 20 and 21. The probes or amplifiers 14 and 15 are accordingly small and movable to permit their ready location close to the points from which signals are to be taken off regardless of the size or location of the amplifier 12 and the terminals 10 and 13. Grid leak resistors 22 and 23 may be provided in amplifiers 14 and 15 and connected to a suitable source of biasing potential and other suitable operating potentials are furnished in a well-known manner by a power supply which is not shown. A certain amount of inherent capacity exists between ground, as represented by the grounded casing of amplifier 14, and the conductive members comprising terminals 16 and the circuits associated therewith. This capacity is indicated as a small condenser 24 shown in dotted lines on the drawing. A similar inherent capacity associated with terminal 18 is shown in dotted lines as condenser 25. The capacity between terminals 10 and 16 and the capacity indicated by condenser 24 comprise a capacitance-type voltage divider for the signal appearing on terminal 10 to provide a variable portion of the signal to the control electrode of electron tube 17. It will be understood that the portion of the signal voltage which is applied to the control electrode may be readily varied or adjusted by changing the space between terminals 10 and 16 to adjust the capacitance therebetween. A similar capacitance type voltage divider including the capacitance between terminals 13 and 18 and capacitance 25 permits adjustment of the portion of the output signal from amplifier 12 to be applied to the control electrode of electron tube 19. The arrangement described permits the application of the desired signals to the control electrodes of tubes 17 and 19 respectively with respectively equal phase shift.

After amplification of the input and output signals derived from terminals 16 and 18 respectively, in amplifiers 14 and 15, the signals are fed through flexible coaxial cables 20 and 21 and through coupling capacitors 26 and 27 to the control electrodes of electron tubes 28 and 29, respectively, which serve as portions of an amplifier 30. The tubes 28 and 29 are symmetrically arranged and are provided with a common cathode resistor, which is connected to a suitable source of operating potentials for the amplifier (not shown). The signals generated in the anode circuits of these amplifier tubes may be further amplified and then applied to deflecting plates 31 and 32 which provide deflections in a direction hereinafter referred to as being vertical to the cathode ray beam of cathode ray tube 33. An arrow in the drawing indicates the direction across the luminescent screen hereinafter referred to as horizontal.

Any other type of oscillograph suitable for use at the frequencies to be employed may, of course, be provided in lieu of the cathode ray tube oscillograph shown.

Pick-up amplifiers 14 and 15 are preferably as rigorously identical to each other as possible and the remainder of the system including cables 20 and 21 and the input and output circuits of amplifier tubes 28 and 29 should also be entirely symmetrical. It will be understood that suitable operating potentials should be furnished to the electrodes of the electron tubes 7, 8, 17, 19, 28 and 29 in any convenient manner, as well as to the oscillators 1 and 2, to motor 3, amplifier 9, apparatus 12, and to cathode ray tube 33. While the electron tubes are each shown as comprising more than one grid, triode tubes or tubes of any desired number of grids or other electrodes may be employed which are suited to the conditions encountered.

Cathode ray tube 33 includes deflecting plates 34 and 35 for horizontal deflections of a luminous spot across a screen in the direction of the arrow in addition to the plates 31 and 32 for vertical deflections. Plates 34 and 35 are energized by a voltage derived from the variable frequency signal generated in oscillator 2 after the signal has been applied to a frequency discriminator 36 of any well-known type to provide a voltage variable in proportion to or in accordance with, the variations in frequency of oscillator 2. An amplifier 37 may be interposed between frequency discriminator 36 and the horizontal deflecting plates. Deflections of the spot on the screen of the cathode ray tube 33 are accordingly accomplished by deflecting plates 34, 35 in the horizontal direction in accordance with variations of the frequency of oscillator 2. Deflections at right angles under the influence of deflecting plates 31, 32 are controlled by the intensity of the signals from terminals 10 and 13, which signals are added algebraically in amplifier 30 and amplified as desired, and the resultant image produced on the screen of the cathode ray tube is a wide band of illumination extending horizontally across the screen in the direction of the arrow and bounded by approximately sinuous contours at a vertical distance from the arrow, which represents the horizontal axis of the cathode ray tube screen, the distance of the boundaries from the axis being dependent upon the intensity of the algebraic sum of the signals appearing on terminals 10 and 13. These signals are of relative high frequency, such as one megacycle or more, and the band of illumination will normally appear substantially solid due to the very rapid motion of the spot in the direction approximately perpendicular to the arrow relative to the velocity of the horizontal trace. It will be understood that the amplified signals from terminals 10 and 13 are effectively added algebraically by the tubes 28 and 29 connected as shown. It will be apparent that other algebraic combining of the signals will provide useful indications. For instance, the signals may be algebraically subtracted to provide minima where maxima would have occurred if the signals had been added.

If desired, a detector may be incorporated in amplifier 30 which will give a single line trace on the screen of the cathode ray tube of the shape of one of the sinuous contours of the band of illumination described above.

In addition to the equipment above described, a fixed frequency oscillator 38 for operation at, for instance, one megacycle, or a variable frequency oscillator 39 of which the frequency may be controlled by a manual adjusting knob 40, or both, is provided. A selector switch 41 is arranged to apply the signal from a desired one of the two oscillators, if both are provided, to an harmonic generator 42, the output of which is connected to a mixer 43. The mixer also receives the signal from the anode circuit of electron tube 8, which is the same signal as that supplied to amplifier 9. The interference or beat produced between the harmonics of the reference frequency signal from oscillator 38 or 39 and the signal from tube 8 yields a signal which is applied to a low-pass filter 44. An output signal from the low-pass filter exists only if the signal frequency from tube 8 is very close to the frequency of one of the harmonics produced in harmonic generator 42. The output signal from the low-pass filter 44 is furnished to a device 45 which comprises a detector and amplifier 45 and is then supplied, preferably as a direct current voltage pulse, to an intensity controlling electrode 46 of the cathode ray tube 33 with polarity such as to either increase or decrease the intensity of the luminous spot on the screen of the tube. Thus, each time a signal appears in the output circuit of low-pass filter 44, a voltage is produced which changes the spot intensity and provides a visible indication at a predetermined point on the screen. It will be apparent that each time the frequency of the signal appearing in electron tubes 7 and 8 passes through a value that is equal to successive multiples or harmonics of the reference frequency, from oscillators 38 or 39, a bright or dark point or line appears in the trace on the cathode ray tube screen, and these marking points or lines calibrate the screen in frequency across the horizontal axis. The marking indications recur, of course, at points representing multiples of the reference frequency, such as at 1, 2, 3, 4, and 5 megacycles if the reference frequency is 1 megacycle and the test signal is varied through a band of from about ¾ to 5¼ megacycles.

To test the frequency response characteristics of an amplifier 12 using the equipment described, terminal 16 is first placed close to terminal 10 to analyze the signal provided from amplifier 9. The cathode ray tube screen should show a wide luminous band bounded by straight lines, the lines being parallel to the arrow shown on the drawing, or, if a detector is incorporated in amplifier 30, the wide band will appear only as a straight line. Departure from a straight line in either case indicates an output from amplifier 9 which is not of constant amplitude. During this portion of the test, amplifier 15 should be isolated or deenergized so as to provide no signal to the control electrode of tube 29. Now if terminal 16 of pick-up probe amplifier 14 is removed from terminal 10, and either probe amplifier terminal 16 or 18 is positioned to pick up the signal from terminal 13, the other probe being deenergized or isolated against signal pick up, the resultant trace on the screen of the cathode ray tube provides a picture of the variation in amplification factor of amplifier 12 with frequency throughout the test signal frequency band. This trace corresponds to an amplitude characteristic curve for the amplifier, or other apparatus, under test.

In order to provide indications of the phase distortion introduced by apparatus 12, pick-up amplifiers 14 and 15 are both energized by coupling between terminals 10 and 16, and 13 and 18 respectively. The respective couplings are regulated preferably in such a way that the deflecting influence of the input signal collected by amplifier 14 from terminal 10 will be somewhat greater than that of the output signal collected by amplifier 15. The frequencies of the signals appearing in amplifiers 14 and 15, of course, are equal but the signals differ in phase in accordance with the phase displacement introduced in apparatus 12. Whenever during the frequency sweep the phase displacement between input and output signals is equal to an integral number of half cycles, the algebraic sum developed in amplifier 30 from the two signal voltages will become a minimum or maximum depending upon whether the phase difference is an odd or even number of half cycles.

If the amplifier 12 comprises a large number of stages, and has a relatively great phase shift, a large number of such minima or maxima will appear across the screen. If the amplifier 12 is one providing a minimum of phase distortion, on the other hand, that is if it introduces a phase displacement proportional to the frequency only a small number of maxima and minima will be produced, and it will be possible to find a value for the reference frequency, produced in oscillator 39, such that the successive harmonics of the reference frequency serve to mark the trace on the cathode ray screen at points corresponding substantially exactly with the successive minima and maxima appearing on the trace. If substantial phase distortion is present, however, substantial coincidence between minima and maxima and the locating points will occur only in certain portions of the range and additional maxima and minima will be present. It is always possible by varying the frequency of oscillator 39 to bring about coincidence between any one selected minimum or maximum with a marking pulse representing a harmonic of the reference frequency, making it possible to determine accurately the particular frequency corresponding to that point on the trace. It is then possible with a minimum of calculation to evaluate accurately the phase distortion introduced by the amplifier by noting the number of maxima and minima occurring between desired marking or calibration points, or by adjusting the frequency of oscillator 39 to determine the frequencies at which all or several of the maxima and minima occur.

Certain changes or modifications of the device described will be apparent to those skilled in the art. For instance, a blocking device may be provided in amplifier 30, which blocking device may be triggered by the output of detector and amplifier 45 to block momentarily the signal applied to deflecting plates 31 and 32, causing the luminous spot to remain momentarily on the horizontal axis of the tube as represented by the arrow, or at another predetermined level with respect to the axis, thereby providing a calibrating mark on the screen and making unnecessary the provision of electrode 46. It will also be apparent that additional attenuators in addition to attenuator 11 may be desirable to permit variation of the intensities of signals throughout the apparatus to accommodate it to different applications. Thus, it will be understood that, while a specific application and embodiment of the invention have been described, many modifications may be made without departing from the spirit thereof, and I contemplate by the appended claims to cover any such modifications as fall within the true spirit and scope of my invention.

What I claim as new and desire to secure by Letters Patent of the United States is:

1. A phase distortion analyzer comprising means for impressing a varying frequency test signal on apparatus to be tested to obtain an output signal therefrom, an oscilloscope with two deflecting means operative in respectively transverse directions for providing a trace on the indicating means of said oscilloscope, means for actuating one of said deflecting means in accordance with variations in frequency of said test signal, means for algebraically combining said test signal and said output signal to actuate the other of said deflecting means, and means for applying to said oscilloscope a marking voltage corresponding to a predeterminable adjustable frequency within the limits of variation of frequency of said test signal to calibrate adjustably the trace on said indicating means.

2. Characteristics testing equipment for amplifying apparatus or the like comprising an oscilloscope with means for deflecting in two predetermined transverse directions an indicating spot of light, means for generating a test signal varying cylically through a band of frequencies, means for applying said test signal to said apparatus to obtain an output signal differing from said test signal in accordance with the characteristics of said apparatus, means associated with said signal generating means and with said deflecting means for deflecting said spot in one of said directions in accordance with the variations in frequency of said test signal, means jointly responsive to the amplitude of said test signal and to the amplitude of said output signal for applying to said deflecting means a signal representing the algebraic sum of said test signal and said output signal to deflect said spot in the other of said directions, adjustable reference frequency generating means associated with said test signal generating means for supplying marking signals recurring at equally spaced frequencies in said band, and means for superimposing said marking signals on said light spot to calibrate the spot deflections in said one of said directions.

3. Response curve testing equipment comprising a variable frequency generator, means for cyclically varying the frequency of said generator, means for mixing the output signal of said generator with the output signal of a fixed frequency generator to provide a test signal of varying frequency, means to apply said test signal to a device to be tested to obtain therefrom an output voltage related to said test signal in accordance with the characteristics of said device, an oscilloscope for providing a trace in accordance with two component deflecting voltages, a frequency discriminator for developing a cyclically variable deflecting voltage, said discriminator being energized by the output signal from said variable frequency generator, means to apply said cyclically variable deflecting voltage and said output voltage to said oscilloscope as said component deflecting voltages, a multiple frequency reference signal generator, a mixer connected to receive said test signal and said reference signal to provide recurring low frequency beat signals, a low-pass filter for passing said low frequency beat signals, and means to apply recurring marking indications on said trace in response to controlling voltages derived from the beat signals passing said filter.

4. An arrangement for determining the phase distortion characteristic of a test circuit over a range of frequencies comprising a variable frequency oscillator, means for periodically sweeping the frequency of said oscillator over said range, means for applying said swept frequency waves to said test circuit, means for algebraically adding the swept frequency wave output of said test circuit and said swept frequency waves before application to said test circuit to derive a resultant voltage, a cathode ray oscilloscope comprising a pair of deflection elements for controlling said ray in two coordinates, means for applying said resultant voltage to one set of deflection elements to deflect said ray in one coordinate and means for varying the deflection of said ray along said other coordinate in accordance with the sweeping of said variable frequency oscillator.

JEAN L. DELVAUX.

REFERENCES CITED

The following references are of record in the file of this patent:

UNITED STATES PATENTS

| Number | Name | Date |
|---|---|---|
| 2,084,760 | Beverage | June 22, 1937 |
| 2,143,094 | Swift | Jan. 10, 1939 |
| 2,175,001 | Sherman | Oct. 3, 1939 |
| 2,243,234 | Von Duhn | May 27, 1941 |
| 2,285,038 | Loughlin | June 2, 1942 |
| 2,387,685 | Sanders | Oct. 23, 1945 |